Oct. 19, 1965  C. H. SAVIT  3,212,189
MARINE NAVIGATION PROCEDURE
Filed July 18, 1962  2 Sheets-Sheet 1
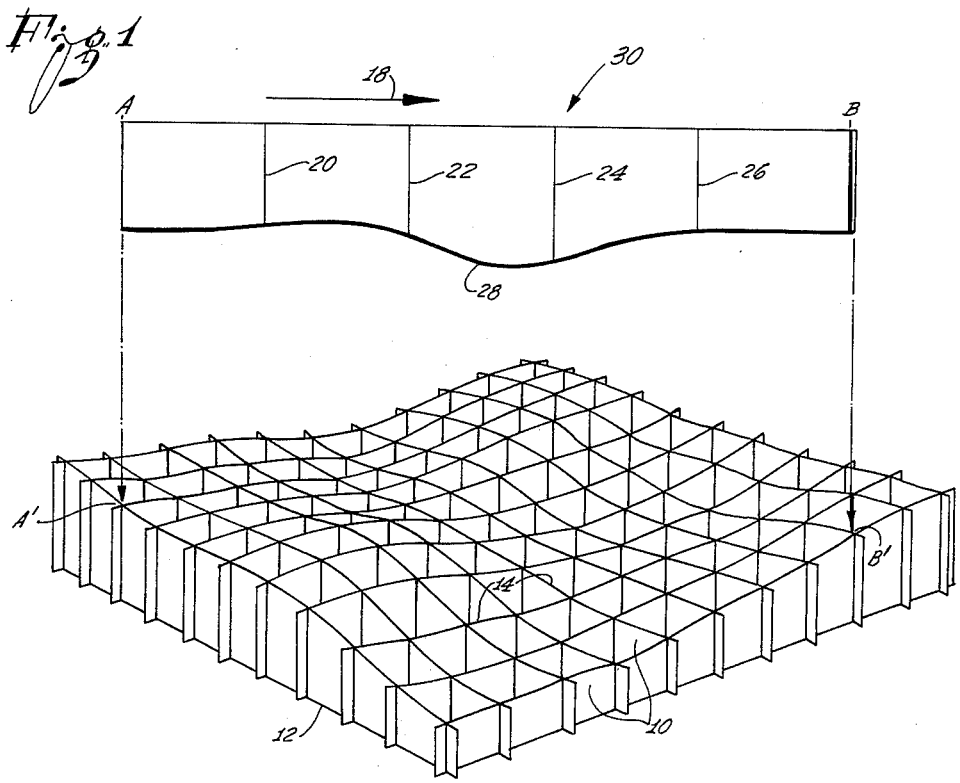
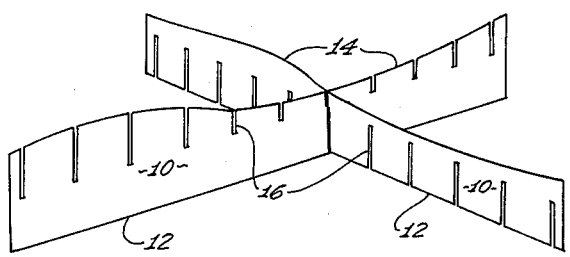
INVENTOR.
Carl H. Savit
Agent Oct. 19, 1965

C. H. SAVIT 3,212,189

MARINE NAVIGATION PROCEDURE

Filed July 18, 1962

INVENTOR.
Carl H. Savit

By Richard Zentner
Agent 3,212,189
MARINE NAVIGATION PROCEDURE
Carl H. Savit, Los Angeles, Calif., assignor to Western Geophysical Company of America, Los Angeles, Calif.
Filed July 18, 1962, Ser. No. 210,773
10 Claims. (Cl. 33—1)

The present invention relates to marine navigation procedures and, more particularly, is concerned with a method for determining the exact location of a craft such as a marine vessel using a dead reckoning system when no other references are available.

In precise navigation procedures, particularly those employed on board submarines and other seagoing vessels, a position fix is generally obtained by means of an automatic dead reckoning system. It is well known that such systems have a tendency to drift and therefore require calibration at periodic intervals to eliminate drift errors which may have accumulated during the interval. Such calibration is conventionally accomplished using electronic position finding equipment which is operated by the reception of radio frequency signals from remote points. In many cases, however, electronic location references are not available because of poor atmospheric conditions, because a submarine is submerged, or because of enemy action.

Under these circumstances, and in order to determine the exact position of the vessel, the necessary information for adjusting the dead reckoning system is obtained by the use of precision depth recorders and charts of previously surveyed distinct areas on the ocean floor, termed landmarks. Conventionally, a number of original precision depth recorder profile charts of each landmark taken along parallel tracks in a known direction are available on board. The ship traverses the landmark on a course parallel to the direction in which available charts have been taken, and precision depth recordings are made. The obtained profile chart is compared to those available, and the correct track, and therefore the correct position at any time, are determined by visual comparison, with interpolation, if necessary.

Disadvantages of the method described above include the uncertainty inherent in the procedure, the undue amount of time required, and the necessity of traversing the landmark in a direction parallel to those taken when originally surveying the landmark.

The use of electronic equipment for automatically comparing the depth recording profile as actually measured with the shape of the landmark has been suggested. However, this type of equipment requires special, expensive charts with conductive and nonconductive areas. Furthermore, such electronic methods also have the disadvantage of not being readily subject to immediate physical verification of the indicated result.

Accordingly, it is one of the main objects of this invention to improve and simplify marine navigation procedures. Further objects include the elimination of drift errors from dead reckoning systems, the determination of the position of a craft by means of precision depth recording in a simplified manner, to exclude the uncertainty existing with prior art methods, and also to exclude the requirement that the craft must traverse the landmark in a given direction.

In accordance with one illustrative embodiment of the invention, a physical representation, or model, of the distance between distinct points of the ship's track and points on the ocean floor below is made. In practice, this distance as measured by a precision depth recorder, is plotted downwardly from a line representing the ship's track. Although this is not a necessary requirement, it may be assumed that the track is a straight horizontal line. The distances plotted downward from this straight line have end points defining a line which exhibits the shape or profile of the ocean floor along and vertically below the track. In the specific illustrative embodiment presently described, the plot as produced by a precision depth recorder on a tape of, for example, recording paper is cut out using a pair of scissors. The depth of the ocean is then represented by the varying width of the strip of tape. The tape may then be reinforced by, or transferred onto a backing of plastic or the like to provide a more rigid, generally planar, physical representation of the profile.

The model of the profile obtained as described above is compared with a relief map of an area of the ocean floor which includes the track described by the ship. As stated above, many such areas have been surveyed and relief maps suitable for the purposes of this invention may readily be prepared in the form of an egg crate-like structure of intersecting strips, one edge of each strip representing a profile of the ocean floor. The operator in possession of a relief map of this or any other suitable type proceeds by holding the profile strip as cut out from the depth recorder tape above the relief map in such a manner that the strip is oriented to coincide with the ship's path when the recording was made; this may be any arbitrarily selected direction or orientation which suits navigational convenience. By effecting a translational motion of the strip over the map without changing the angle of the strip, a position can readily be found in which the profile on the lower edge of the strip matches the profile on the map below it. The position of the strip with respect to the map then indicates the exact position of the track, and therefore that of the ship at any time the track was described. The dead reckoning system of the ship can readily be readjusted from this information.

It will be understood that the method of the present invention as illustrated by the embodiment described above, is essentially empirical in nature. It eliminates, by its simplicity, the number of possible sources of failure inherently present in the rather complex electronic equipment heretofore suggested for automatically solving this problem. It has been shown by tests, that a precision fix for a ship can be obtained by unskilled personnel in a minimum of time and with high accuracy. The certainty of the result obtained exceeds that of prior art position determining equipment, due to the physical verification which is accomplished in the course of performing the method of the present invention.

It will be apparent from the discussion given above, that the profile strip, as cut out from the depth recorder tape, constitutes a physical model of the plot of the track versus the distance between points on the track and corresponding points vertically below them. In other words, the physical representation of this plot constitutes the complement of the ocean bottom profile below the track. For this reason, empirically matching them by a translational motion is possible and must lead to the solution of the problem.

It will be apparent that the width of the strip, at any location, is a visible representation of distance or depth. Whereas in the example described above, a cutout strip and a relief map are used, other symbols for distance may be employed. Assuming, for example, that a map of the previously surveyed area, or landmark, is available on board, and successive areas between contour lines are symbolized on the map of different colors, the measurements made by the depth recording system may be used to provide a sequence of differently colored areas along the edge of, for example, a strip of paper, using colored pencils. As a matter of course, the color scheme employed in the symbolic representation of depths must coincide with that used on the map. For simplification, it is still assumed that the ship's track is a straight line. Then, the operator performs a translational motion, with the strip oriented in the direction of the track, until the position is found in which the colors on the strip edge correspond to those on the map area below it. Instead of colors, other symbols conventionally employed in map making such as hachuring, or numbered contour lines may be used with corresponding symbols marked on the strip. In general, therefore, the map and the "depth track" should bear corresponding visible representations of height and depth, respectively, and these representations should be adapted for engagement and rapid visual matching.

Summarizing the discussion of the invention as described to this point, one of the underlying principles of the method for determining the position of a craft may be defined as the steps of preparing a physical representation of the topography beneath the ship's track, along a generally known bearing or course, such physical representation constituting a sequence of symbols indicative of the distances measured between points on the craft's track and corresponding points on the terrain below it, placing the representation in physical engagement with the map having a corresponding symbolic representation of topography, and moving the representation to obtain a linear match of the two symbolic representations. As discussed hereinabove, the symbolic representation may use hachuring, color differences, numbered contours, or strip width to indicate depth or topography.

The novel features which are believed to be characteristic of the invention, both as to its organization and methods of operation, together with further objects and advantages thereof, will be better understood from the following description considered in connection with the accompanying drawing in which one embodiment of the invention is illustrated by way of example. It is to be expressly understood, however, that the drawing is for the purpose of illustration and description only, and is not intended as a definition of the limits of the invention.

In the drawing:

FIG. 1 illustrates in a perspective view a relief map showing the configuration of the ocean floor of a previously surveyed landmark and a strip-shaped representation of depths as recorded along the course of a straight track;

FIG. 2 is a detail showing of two intersecting strip-shaped elements of the map of FIG. 1.

Figure 3:
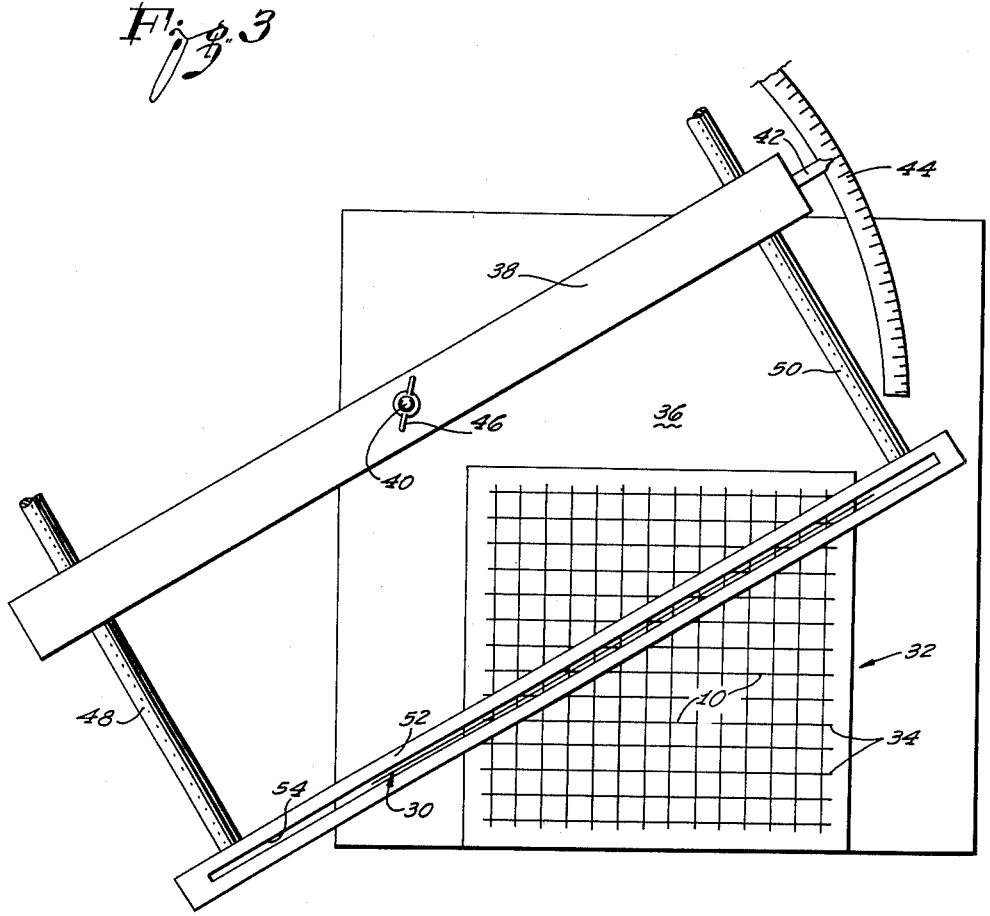
FIG. 3 is a schematic top view of a device suitable for determining the position of a craft, using the map and the strip-shaped depth representation of FIG. 1.

Referring now to the relief map of a landmark useful for the purpose of the present invention, a map of this type may be formed by an egg crate-like arrangement of two sets of orthogonally intersecting strips 10, as has been suggested in the prior art. The lower edges 12 of all strips are shown as straight lines so that the entire assembly rests solidly on a flat surface. The upper edges 14 of the strips are individually curved and, as a whole, define the irregular surface of the ocean floor as determined by previously surveying the area or landmark of which the map is a reduced-scale representation.

The strips are interconnected by half-slots 16 in the manner shown in detail in FIG. 2 and as is known in the manufacture of egg crate cartons or other applications in the packing field. In this regard, the term "half-slot" is understood to include slots which may be shorter or exceed the approximate half-width of strips 10, as long as they serve the intended purpose.

It is an essential advantage of a relief map of this type that the assembly of strips 10 may be collapsed by applying slight pressure at diagonally opposite corners, so that in this folded state a minimum storage room is required. This important feature will be appreciated when it is considered that a seagoing vessel, when underway, may be required to have a number of maps of different landmarks available for determining its position in any region along an extended trip. When unfolded, the map snaps into its proper shape with right angles formed between the two sets of parallel strips 10 because the slots 16 have been cut squarely and of a width precisely equal to the thickness of the plastic sheet, from which the strips are made. Good results have been obtained when using a moderately stiff material such as 0.010 inch thick acetate plastic sheet.

It is now assumed that a vessel traverses the landmark from west to east, but the exact position of its straight track above the landmark is unknown, and is to be determined. During the time in which the vessel passes from a point A to a point B, precision depth recordings are made at a number of points along the track A-B. The plot of measured depths at a scale identical with that of the relief map formed by strips 10, is shown in the upper portion of FIG. 1. The line A-B represents the track, with the arrow 18 indicating the bearing which may be assumed to be west-east for the purpose of illustration. Vertical lines drawn downward from the line A-B indicate the depth measured which is symbolically represented by the length of lines 20, 22, 24 and 26, by way of example. The line or plot 28 connecting the end points is a replica of the ocean floor profile exactly vertically below the vessel because the plane defined by track AB and lines 20 through 28 is a vertical surface through the track AB.

A physical model of the plot as defined by track AB and profile 28 is readily obtained from the tape of a depth recorded by cutting along the line traced by the recorder stylus. The strip, generally of paper, may then be reinforced for easier manipulation, for example by gluing it on a stiff base of cardboard, plastic or the like. As a result, a planar strip-shaped model is obtained which may be considered the complement to the actual ocean profile since the edge 28, which is the lower edge in the position shown in FIG. 1 has been obtained by depth recording.

The dead reckoning system on the vessel has indicated, as it was assumed, that the direction of traverse was west-east. Accordingly, the operator attempts to match the edge 28 with a profile on the map formed by strips 10, taking care that the strip 30 assumes and maintains this direction when moved over the map in a translatory motion so that the plane of the strip 30 remains parallel with the plane of the paper of FIG. 1.

By empirically hunting in this manner for the matching profile, points A' and B' are readily found as the points defining the profile which is complementary with that formed by edge 28, and the exact location of the track AB is thereby determined.

At this point it is noted that the method discussed herein is based on relative depth recording, regardless of the absolute depth at any of the points of the track.

FIG. 3 is a schematic top view of a device suitable for determining the position of a craft, using the map and a guide structure for the strip-shaped depth representation of FIG. 1. An arrangement for this purpose may include a frame 32 provided with internal slots 34 for maintaining the map formed by strips 10 in a fixed position. A selected map from a large library of foldable maps may be removably inserted in the frame. The frame 32 may be mounted on a base board 36 supporting the guide structure for facilitating the matching step. A suitable structure schematically illustrated in FIG. 3 may include an arm 38 mounted to pivot in a horizontal plane about its center 40. The angular position of arm 38 may be adjusted to coincide with the bearing of the craft as indicated by the dead reckoning system, using pointer 42 and protractor scale 44; the arm 38 is then secured in this position by tightening a butterfly nut 46.

The arm 38 is provided with a pair of holes at locations toward its ends, and sliding rods 48 and 50 extends through each one of the holes, respectively. An elongated bar 52 having a slot 54 made along its centerline is secured to the ends of rods 48 and 50. Thus, the position of the slot 54 with respect to the map formed by strips 10 may be adjusted in two ways. As stated above, the angular position of arm 38 supporting rods 48, 50 and bar 52 is regulated using pointer 42 and scale 44, and then fixed by tightening butterfly nut 46. It will be seen that then the bar 52 may execute a translational motion over the map, with rods 48 and 50 sliding in the holes through arm 38 without change in its angular position. When a strip-shaped representation 30 of the recorded ocean floor profile, suitably reinforced, is inserted in slot 54, as shown, it is constrained to translational movement, parallel or perpendicular to the bar 52. The strip 30 may then be slid laterally in slot 54 to a matching position with the contour map. It will be apparent that finding the profile on the map may be greatly facilitated when using a device of the type described and illustrated in FIG. 3.

With regard to the arrangement of FIG. 3, the protractor scale 44 is shown greatly enlarged for convenience of illustration, and would actually be much smaller and located adjacent the pivot 40. In addition, the slotted member 52 and member 38 may form a pair of parallel rulers, with the arms 48 and 50 pivotally connected to members 38 and 52.

As mention above, instead of representing the measured depth by the width of the strip (FIG. 1), representation by colors may be employed. In this modification, conventional flat maps having depth contour lines and differently colored areas between them may be employed. Such an arrangement has the advantage of reduced storage area so that maps of a greater number of areas may be available, and the slight disadvantage of requiring the measurement of absolute values of depth. In this case, a strip of paper or the like may be used and colored in any convenient manner in accordance with the information about depth obtained by precision depth recording. Alternatively, the depth recorder may be programmed to provide the linear multicolor representation of depth, through the use of different colored marking devices. Another alternative would involve the use of a simple adjustable device including a number of strips having colored areas which may easily be designed to represent, by a linear sequence of colors, the depths recorded when traversing a landmark. Such sequence of colored areas is then empirically brought to coincide with a linear area on the map by translational motion, in a manner analogous with that described in connection with relief maps.

It is to be understood that the above described arrangements are illustrative of the application of the principles of the invention. Numerous other arrangements may be devised by those skilled in the art without departing from the spirit and scope of the invention. Thus, by way of example and not of limitation, the track described by the craft may have the shape of a circle. In this case, the operator bends the strip 30 to form a cylinder of which the lower edge is matched with a circular profile on the relief map by translational motion of the cylinder. In a further modification, the steepness, or gradient of depth may be symbolized by the density of recorded marks on a strip of paper, when a transverse mark is made on the strip upon the occasion of each 10 foot change in depth, for specific example. On the conventional type of maps showing depth contour lines the density of these lines is indicative of depth gradient. Therefore, the density of map contour lines and the density of marks made on the paper strip may be compared and the correct matching position may be found without having reference to the absolute magnitude of depth. The present invention is also applicable to aircraft position determination, through the use of radar determined height measurements, corrected where required by altimeter readings.

Accordingly, from the foregoing remarks, it is to be understood that the present invention is to be limited only by the spirit and scope of the appended claims.

What is claimed is:

1. A method which comprises:
preparing a physical model of the contour of the vertical area between a craft's track and the terrain below it, with one edge of said model representing a complement of the terrain profile; and
determining the position of said track by empirically bringing into coincidence said edge with the corresponding profile on a relief map of said terrain.

2. A method for determining the position of a marine vessel, which comprises:
preparing a planar physical model of the vertical area between the vessel's track and the marine floor below it, one edge of said model representing a physical complement of the marine floor profile; and
determining the position of said track by empirically bringing into engagement said edge with a matching profile on a relief map of said terrain.

3. A method for determining the exact position of a navigable craft describing a predetermined track of unknown position above a terrain, which comprises:
recording the distance from a plurality of first points on said track to a plurality of second points on the surface of the terrain;
preparing a physical model of said recorded distances combined in the form of a strip of which one edge represents the track and the other edge represents a complement of the terrain profile along said second points below the track; and
bringing said other strip edge representing the complementary profile along the second, recorded points into contact with a relief map of said terrain in a number of different positions until a position is found, in which the edge representing the complementary terrain profile below the track matches the map profile to indicate the exact position of the track and therefore the position of the craft during the time the track was described.

4. A method for determining the exact position of a marine vessel traversing a predetermined track above a predetermined area of the ocean floor, which comprises:
recording the distance from a plurality of first points on said track to a plurality of second points on the ocean floor;
preparing a physical model of said recorded distances as plotted against said track in the form of a sheet material cutout of which one edge represents the track and the other edge represents a complement of the ocean floor profile along said second points; and
bringing the edge representing the complementary profile into contact with a relief map of said area of the ocean floor in a number of different positions until a position is found, in which this complementary edge matches the map profile to indicate the position of the track and therefore the position of the vessel during the time the track was traversed.

5. A method for determining the position of a marine vessel, which comprises:
recording the depth of the ocean floor at a number of points along a length of the track of said vessel in a predetermined direction within a predetermined area;
marking on flat sheet material the recorded depths as points which are accordingly spaced from a line representing said track;
cutting one edge of said sheet material to correspond to the line connecting the points indicative of recorded depth; and
empirically determining the correct position of the track by finding on a relief map of said area the profile in said predetermined direction which matches said edge.

6. A method for eliminating drift errors from dead reckoning systems used in marine navigations systems, which comprises:

preparing a physical representation of the vertical area between the vessel's track and the marine floor below it by means of precision depth recording to obtain a model of which one edge is a complement to the marine floor profile along a track of which the length and direction are indicated by said dead reckoning system;

determining the exact position of said track by empirically bringing into coincidence said edge with a profile of a relief map of the marine floor to determine the exact position of the track and therefore the position of the vessel; and adjusting said dead reckoning system in accordance with the correctly determined position of the track.

7. A method for determining the position of a marine vessel, which comprises:

recording the depth of the ocean floor at a number of points along a length of the track of said vessel in a predetermined direction within a predetermined area;

marking on flat sheet material the recorded depths as points which are according spaced from a line representing said track;

cutting from said sheet material a section of which one edge corresponds to the line connecting the points indicative of recorded depth; and empirically determining the correct position of the track by finding on a relief map of said area the profile in said predetermined direction which matches said edge;

said relief map comprising a foldable grid-like structure of intersecting strips joined to one another at the locations of intersection by transverse slots and having one side shaped to represent a relief map of the ocean floor area.

8. A system for determining the position of a craft's track, comprising:

a relief map of an area including the craft's track; and a strip-shaped representation of the plot of the track versus the distance measured between points of the track and points on said area;

one edge of the strip representing the profile of said area along said track suitable for matchingly engaging said map.

9. In combination, a map including a visible representation of height distribution over a predetermined terrain, a visible representation of depth as measured along a craft's track suitable for empirically determining the position of said track by engagement and matching with said map, and means for orienting said depth representation at a predetermined angle with respect to said map as it is compared with successive areas of said map.

10. A system for determining the position of a ship's track, comprising:

a relief map of an area of the ocean floor below the ship's track, said map including a foldable grid-like structure of intersecting strips joined to one another at the locations of intersection by transverse slots and having one side shaped to represent a relief map of the ocean floor area;

a strip-shaped representation of the area between the ship's track and the ocean floor profile vertically below it, as determined by depth recording when the track was described;

one edge of said strip-shaped representation constituting a model of the profile of said area along said track, suitable for matchingly engaging said map; and means for orienting said depth representation at a predetermined angle with respect to said map as it is compared with successive areas of said map.

References Cited by the Examiner

UNITED STATES PATENTS

| | | | |
|---|---|---|---|
| 2,737,726 | 3/56 | Christiansen | 33—174 |
| 2,847,855 | 8/58 | Berger | 73—178 |
| 2,887,791 | 5/59 | Garbutt | 35—41 |
| 2,940,072 | 6/60 | Florsheim. | |

FOREIGN PATENTS 537,577　5/22　France.

ISAAC LISANN, *Primary Examiner.*